United States Patent
Chiba et al.

(10) Patent No.: US 6,687,089 B2
(45) Date of Patent: Feb. 3, 2004

(54) THIN FILM MAGNETIC HEAD WITH BASE COAT AND SMALL POLE-TIP RECESS

(75) Inventors: Hiromu Chiba, Toyko (JP); Kenji Furusawa, Tokyo (JP); Toshio Tamura, Tokyo (JP); Yuji Ochiai, Tokyo (JP)

(73) Assignee: Hitachi Ltd., Tokyo (JP)

( * ) Notice: Subject to any disclaimer, the term of this patent is extended or adjusted under 35 U.S.C. 154(b) by 0 days.

(21) Appl. No.: 09/988,437

(22) Filed: Nov. 20, 2001

(65) Prior Publication Data

US 2002/0105758 A1 Aug. 8, 2002

(30) Foreign Application Priority Data

Feb. 8, 2001 (JP) ........................ 2001-031701

(51) Int. Cl.⁷ ..................... G11B 5/60; G11B 15/64; G11B 17/32; G11B 21/20
(52) U.S. Cl. .................................... 360/235.4
(58) Field of Search ................... 360/235.4, 235.3, 360/235.1, 234.3, 234, 230, 122

(56) References Cited

U.S. PATENT DOCUMENTS

| | | | | |
|---|---|---|---|---|
| 5,617,273 A | * | 4/1997 | Carr et al. | 360/234.7 |
| 5,822,153 A | * | 10/1998 | Lairson et al. | 360/234.7 |
| 5,930,077 A | * | 7/1999 | Obata et al. | 360/122 |
| 6,122,148 A | * | 9/2000 | Hamaguchi et al. | 360/234.3 |
| 6,219,200 B1 | * | 4/2001 | Waki et al. | 360/122 |
| 6,252,741 B1 | * | 6/2001 | Ahn | 29/603.07 |

FOREIGN PATENT DOCUMENTS

JP 05-046927 A 2/1993

* cited by examiner

Primary Examiner—Julie Anne Watko
(74) Attorney, Agent, or Firm—Townsend and Townsend and Crew LLP

(57) ABSTRACT

A magnetic head is formed of materials having different hardnesses. The head includes a base coat formed on a substrate having a high hardness, for example alumina titanium carbide, upon which a base coat, for example alumina, is formed. The base coat typically had a thickness in the range of 0.05 to 0.5 μm. This structure provides an improved flying height for heads manufactured using a lapping process.

14 Claims, 10 Drawing Sheets

* THE NUMERICAL VALUES INDICATE THE THICKNESS OF THE BASE COAT

THIN FILM MAGNETIC HEAD WITH BASE COAT AND SMALL POLE-TIP RECESS

BACKGROUND OF THE INVENTION

The present invention relates to a giant-magneto-resistive (GMR) or tunnel-magnetoresistive (TMR) magnetic head used in a hard disk drive.

In recent years, a dramatic improvement in the areal density of a hard disc drive has been desired, and for achieving this improvement, it is necessary to greatly reduce the flying height of a magnetic head relative to a magnetic recording medium from present levels of about 30 nm. To realize this reduction of the flying height, it is essential to work with higher accuracy the slider surface (air bearing surface) of the magnetic head disposed opposite to the rotating magnetic recording medium.

In general, magnetic heads have been fabricated as follows. On a hard substrate of $Al_2O_3$—TiC (alumina titanium carbide), etc. are formed a base coat of $Al_2O_3$ (alumina, film thickness of 2–10 $\mu$m), an element (GMR element or TMR element) comprising a shield layer, a gap film and a magneto-resistive film etc. and an overcoat (alumina layer), all of which are sequentially laminated. The above structure is formed on a substrate having a size of 5 inches by a thin-film process in which lithography is used. After that, this substrate is cut by use of a diamond blade (diamond wheel) to row bars each having a length of 2 inches. After removing strains caused during the cutting by a method such as two-face lapping etc., the slider surface (air-bearing surface) of the magnetic head opposed to the magnetic recording medium is formed by the high-accuracy lapping of a surface of the structure directed at right angles to the layers thereof laminated on the substrate. After that, by cutting each of the row bars into small pieces containing individual magnetoresistive elements, a magnetic head is completed.

In the above method of lapping the row bar, the row bar bonded to a lapping jig is made to slide under pressure on a rotating lapping plate made of a metal while dripping onto the lapping plate a slurry containing abrasive grains of diamond etc. As lapping conditions, there are a case where the lapping jig on which the row bar is stuck is rotated on its axis and around the rotating lapping plate, and another case where the row bar is made to oscillate in a direction intersecting at right angles to the direction of rotation of the lapping plate, etc.

SUMMARY OF THE INVENTION

However, because the mechanical hardness of each of the portions that constitute the row bar, i.e., the substrate, the base coat, the magnetic element, the overcoat, etc. is different from each other, it is very difficult to uniformly lap them when using the above prior art. Therefore, in a completed magnetic head, a large recession is formed between the air-bearing surface of the substrate and the magnetic element, which recession causes a substantial increase in the flying height, so that there occurred such an inconvenience as it is difficult to efficiently reproduce information from a large-capacity magnetic recording medium.

Further, among the portions that constitute the row bar, the magnetic element has a lower mechanical hardness and is most susceptible to the adverse effect of abrasive grains used. In other words, the magnetic element has a layered structure having a lower shield layer, a magnetoresistive film, and an upper shield layer etc. and the film thickness of this magnetoresistive film is very thin (for example, several tens of nano-meter) and, therefore, scratches traversing the magnetoresistive film from the above shield layers are apt to be formed.

In a case where the depth of this scratch is large, an electrical short path is formed between the upper and lower shield layers including the magnetoresistive film, and this electrical short path not only causes the function of the magnetoresistive element portion to be lost, but also forms a dead layer during the lapping, so that the characteristics of the magnetic head itself and the reliability thereof are greatly influenced. For this reason, further planarization of a lapped surface is also required simultaneously.

The object of the invention is to solve the above problems and to obtain a magnetic head used for reading or writing magnetic recording information in which magnetic head the pole tip recession occurring between the substrate and the magnetic element is minimized and in which magnetic head the smoothness of a lapped surface is improved.

According to the first aspect of the invention achieving the object, there is provided a magnetic head comprising a substrate, a base coat located on the substrate and a magnetic element located on the base coat, the film thickness of the base coat being in a range of 0.05 to 0.5 $\mu$m.

According to the second aspect of the invention, a distance defined between an air-bearing surface provided on a substrate surface, which surface intersects at right angles a face along which the magnetic element is located, and a terminal face of the magnetic element which terminal face is located on the same side as the air-bearing surface is in a range not more than 1 nm and, at the same time, an average surface roughness of this air-bearing surface is in another range not more than 10 nm.

According to the third aspect of the invention, the Vickers hardness of the base coat is lower than that of the substrate and is higher than that of the magnetic element, and the film thickness of the base coat is in a range of 0.05 to 0.5 $\mu$m. Specifically, the base coat is formed of $Al_2O_3$ (alumina) and the substrate is formed of $Al_2O_3$—TiC (alumina titanium carbide).

In the present invention, it becomes possible to realize a magnetic head in which a recession occurring between the substrate and the magnetic element is minimized and in which the smoothness of a lapped surface is remarkably improved.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF PREFERRED EMBODIMENTS

Embodiments of the invention are described in detail by referring to the attached drawings.

Figure 1A:
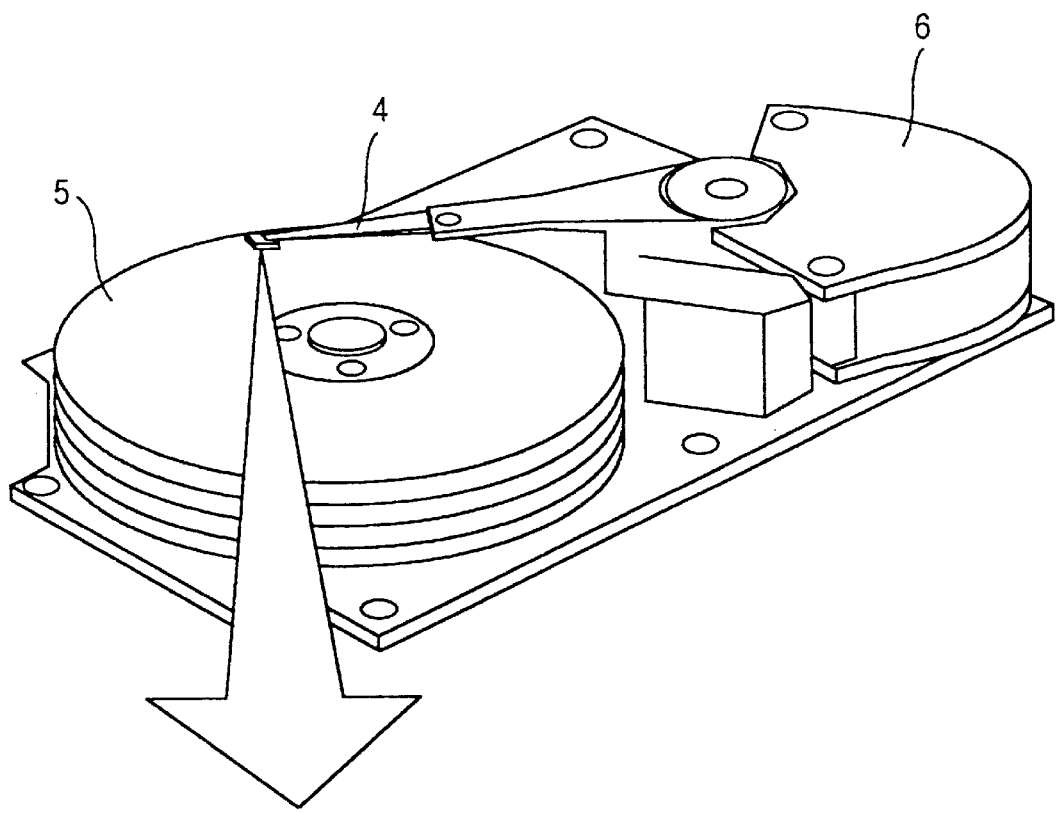
FIGS. 1A and 1B are schematic drawings of a hard disk drive provided with a magnetic head embodying the invention.
Figure 1B:
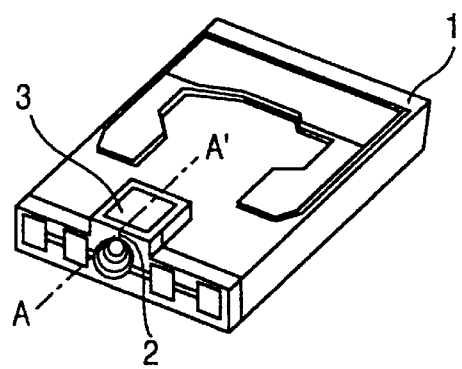

FIGS. 1A and 1B are schematic drawings of a hard disk drive provided with a giant-magnetoresistive (GMR) or tunnel-magnetoresistive (TMR) magnetic head. In FIG. 1A, the hard disk drive is completed by combining a magnetic head 1 fixed to a suspension 4 with a magnetic disk 5 which is a recording medium. The suspension 4 is connected to a drive 6 and the writing or reading of magnetic recording information is performed by operating the drive 6 with respect to the rotating magnetic disk 5 to thereby move the magnetic head 1 to a predetermined position located in the magnetic disk 5.

FIG. 1B is a schematic drawing of the magnetic head 1 fixed to the suspension 4. An air-bearing surface 3 is formed on the surface of the magnetic head 1 which surface is opposed to the magnetic recording surface of the magnetic disk 5. A magnetic element portion 2 for performing the writing or reading of magnetic recording information is formed on a face intersecting at right angles the surface on which the air-bearing surface 3 is formed.

Figure 2:
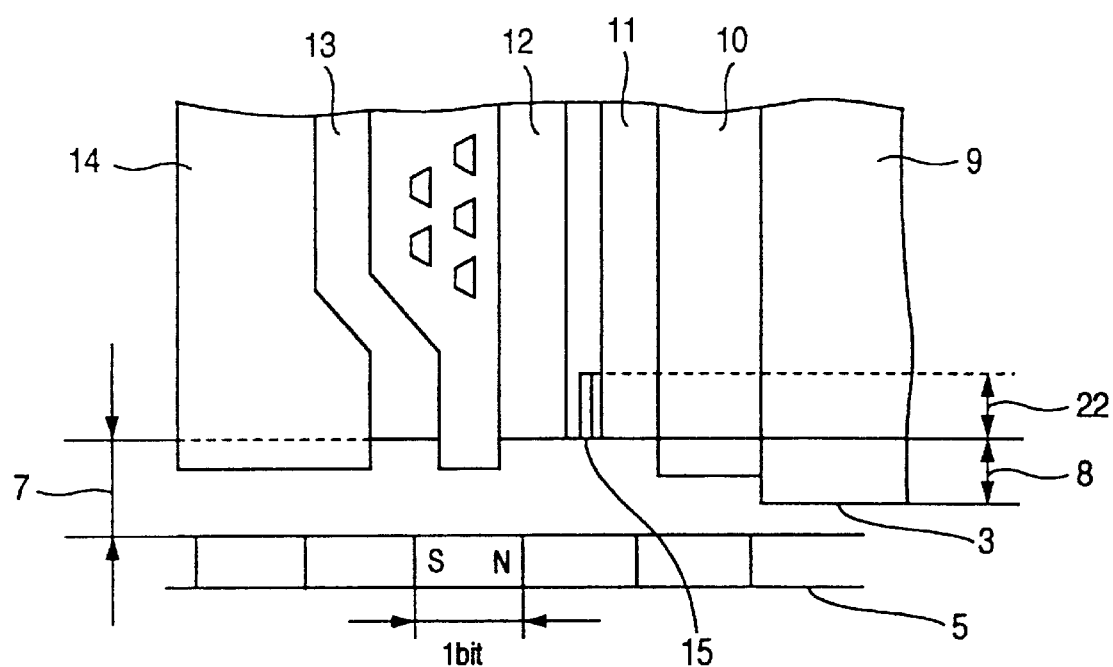
FIG. 2 is a cross-sectional view taken along line A-A' showing the structure of the magnetic head.

FIG. 2 is a sectional view of the above magnetic head, which sectional view is taken on line A-A' in FIG. 1B. In the figure, on a substrate 9 are formed in sequence a base coat 10, a lower shield layer 11, an upper shield layer 12, an upper magnetic layer 13 and an overcoat 14. A magnetic recording film 15 is provided to be sandwiched between the lower shield layer 11 and the upper shield layer 12, whereby the magnetic head is completed.

Because the magnetic head 1 is disposed to be opposed to the magnetic recording surface of the magnetic disk 5 and because the writing or reading of magnetic recording information is performed while maintaining a flying height 7 with respect to the rotating magnetic disk 5, the surface of the magnetic head 1 opposed to the magnetic disk 5, i.e., the lower surface of the magnetic head 1 shown in FIG. 2 is lapped. The flying height 7 is a distance from the surface of the magnetic disk 5 to the end of the GMR element 15 of magnetic head 1 which end is present on the side of the air-bearing surface. In other words, the flying height 7 is the distance defined between the lapped surface of the magnetic element and the surface of the magnetic disk 5.

Figure 3:
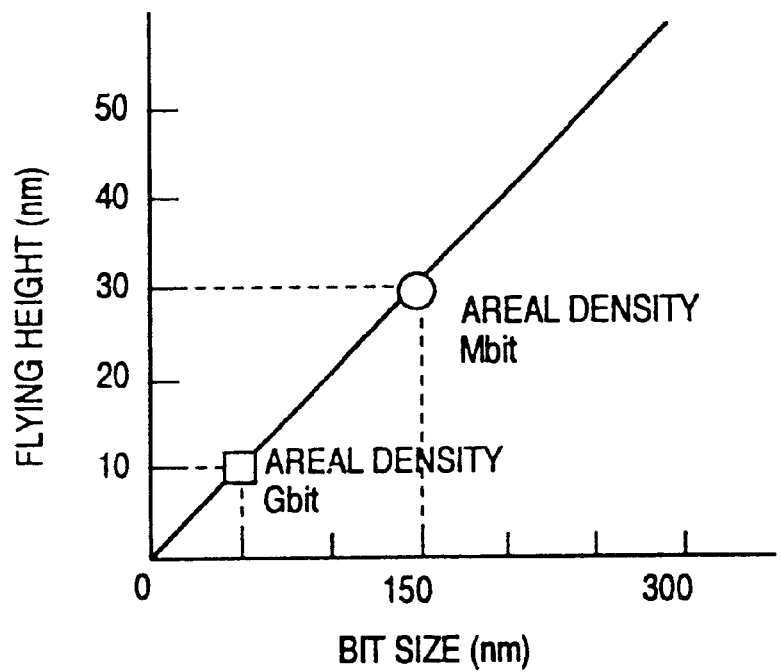
FIG. 3 is a graph showing a relationship present between the bit size of a magnetic disk and a flying height of the magnetic head.

To ensure that more magnetic recording information is written in the magnetic disk 5 or read from the magnetic disk 5 at a high speed and in a sure manner, it is necessary to reduce the above flying height 7 as small as possible. FIG. 3 shows a relationship between the bit size and flying height of the magnetic disk 5. As is apparent from this figure, the smaller the bit size is, the more important the further reduction of the flying height becomes among the characteristics required in the hard disk drive which enables magnetic recording and reading of a large capacity. For example, the flying height is about 30 nm when the magnetic recording capacity is in the range of Mb (megabits, bit size of about 150 nm), which is the present level. However, in the case of GB (gigabits, bit size of about 50 nm), a flying height of not more than about 10 nm is required.

Regarding materials used in the magnetic head shown in FIG. 2, there are used $Al_2O_3$—TiC (alumina titanium carbide) for the substrate 9, $Al_2O_3$ (alumina) for the base coat 10 and overcoat 14, and a plurality of soft magnetic metals such as Permalloy etc. for the lower shield layer 11, the upper magnetic layer 13 and the upper shield layer 12. Namely, the magnetic head has a composite, layered structure. The Vickers hardness of these materials is about 2000 Hv for $Al_2O_3$—TiC (alumina titanium carbide), about 1000 Hv for $Al_2O_3$ (alumina), and about 200 Hv for Permalloy.

Therefore, when the air-bearing surface 3 of the magnetic head 1 shown in FIGS. 1A, 1B, and 2 is lapped by a well-known, conventional lapping method, the difference in the lapping speed resulting from the Vickers hardness difference among the above materials causes unevenness on the lapped surface of the magnetic head 1. More specifically, as shown in the sectional view of the structure of the magnetic head 1 shown in FIG. 2, a region including the GMR element which region has the smallest Vickers hardness is excessively lapped in comparison with the air-bearing surface 3 of the substrate 9, so that the pole-tip recession 8 occurs. In the present specification, the pole-tip recession 8 is defined as the distance between the air-bearing surface 3 of the substrate 9 and the end of the magnetic element which end is located on the side of the air-bearing surface.

The flying height 7 is the distance defined between the end of the magnetic element on the air-bearing surface side of the magnetic head 1 and the surface of the magnetic disk 5. Thus, the occurrence of the pole-tip recession 8 results in an increase in the substantial flying height of the magnetic head 1, which becomes such a great factor as to deteriorate the magnetic recording and reading characteristic which is a representative magnetic property of the magnetic head. For this reason, it is required to minimize this pole-tip recession 8 as the magnetic recording density of the magnetic disk 5 increases. Ultimately, it is desirable that lapping be performed so that no pole-tip recession 8 may occur and so that the end of the magnetic element on the side of the air-bearing surface and the air-bearing surface 3 of the magnetic head 1 may be located on the same plane.

Further, when for some inconvenient reason the magnetic head comes to be in contact with the surface of the magnetic recording film of the magnetic disk, the magnetic head damages the magnetic recording film in a case where the average surface roughness of the air-bearing surface of magnetic head is large, which results in a critical trouble to the magnetic head acting to perform recording and reading. Therefore, it is necessary that the average surface roughness of the air-bearing surface be reduced as small as possible, and ultimately, it is desirable that this average surface roughness be zero.

Figure 4:
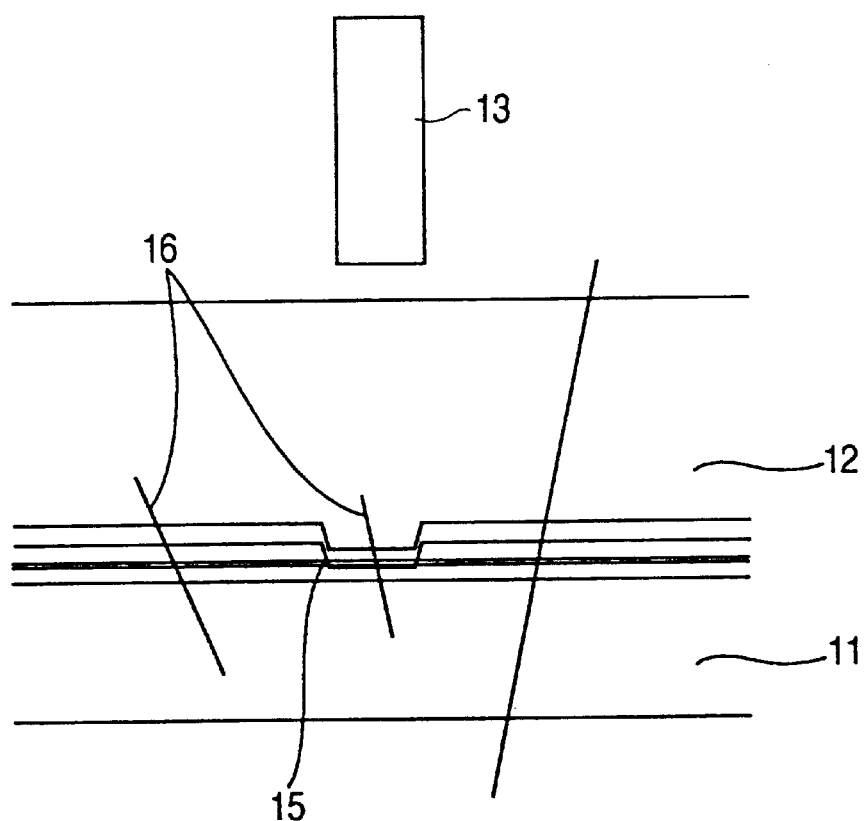
FIG. 4 is a drawing for explaining scratches occurring across a magnetic element.

On the other hand, because the magnetic element made of Permalloy has the low hardness, a scratch 16 is apt to occur, as shown in FIG. 4, during the lapping which scratch traverses the magnetic element interposed between the lower shield layer 11 and the upper shield layer 12. In a giant-magnetoresistive (GMR) magnetic head, the film thickness of a magnetoresistive film is very small (about several tens of nanometers). Thus, in a case where a scratch 16 traversing this film occurs, there is caused in the area an electrical short path between the lower shield layer 11 and the upper shield layer 12, that is, the function of the magnetic head is not only damaged, but also a dead layer (damage layer) occurs during lapping, so that the reliability of the characteristics of the magnetic head is greatly influenced. In the lapping of the air-bearing surface, therefore, it is important not only to reduce the pole-tip recession, but also to reduce the scratch.

The pole-tip recession and the scratch occurring during the lapping of the magnetic head 1 are described in detail below.

First, to examine in detail the occurrence mechanism of the pole-tip recession which occurs between materials each having a different Vickers hardness which materials constitute the magnetic head, i.e., the substrate 9, magnetic recording film 15, base coat 10, etc., the lapped surface of the magnetic head 1 was investigated by use of an atomic force microscope (AFM, produced by Digital Instruments Company, type: nanoscope IIIa-D3100). In this method, the roughness (,i.e., unevenness) of a lapped surface are measured by the probe method, and a cantilever to which a single-crystal diamond is bonded was used as the probe.

Figure 5:
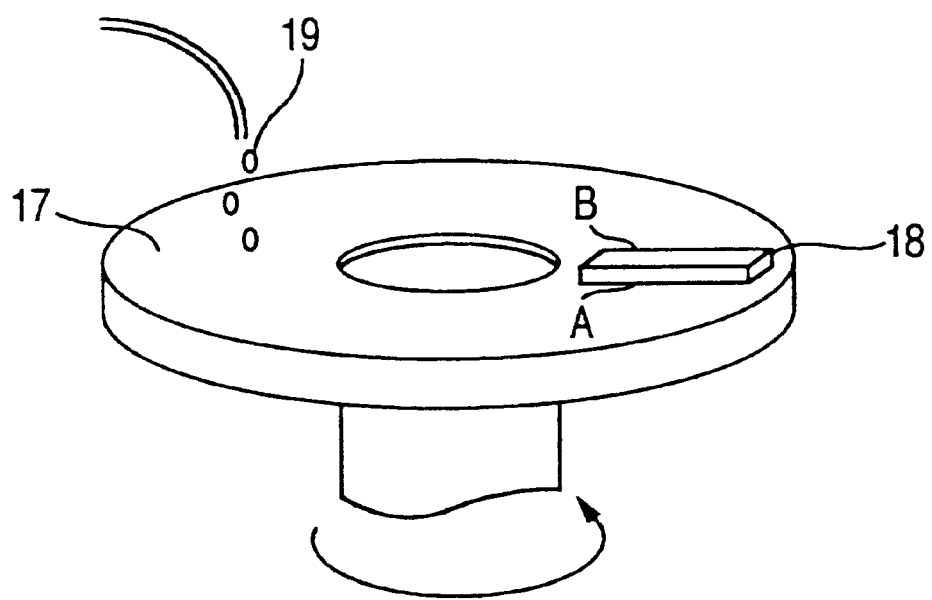
FIG. 5 is a schematic drawing for explaining a method of lapping performed during the production of a magnetic head.

As a well-known method for lapping a workpiece from which the magnetic head is produced, for example, there are a method in which the workpiece is lapped while rotating it on its axis on a lapping plate and simultaneously around the axis of the rotating lapping plate, and another method in which, as shown in FIG. 5, a workpiece 18 is lapped while oscillating it on a lapping plate 17. In particular, in the case where the workpiece 18 is lapped while oscillating it, the rotation of the lapping plate 17 is made to be directed from the side of the substrate 9 (alumina titanium carbide) which constitutes the magnetic head 1 (, that is, in FIG. 5, from side (A) of the workpiece 18) to the side of the magnetic element (Permalloy) (, that is, to side (B) of the workpiece 18), whereby the magnetic element becomes less susceptible to the effects of loose abrasives and chips occurring during lapping, so that the pole-tip recession also becomes small.

Therefore, in order to examine the action of abrasives fixed onto the lapping plate which action occurs on the workpiece form which the magnetic head is produced, an investigation was performed on the lapping phenomenon which occurred when the AFM probe was moved from the side of the substrate 9 to the magnetic element.

Figure 6:
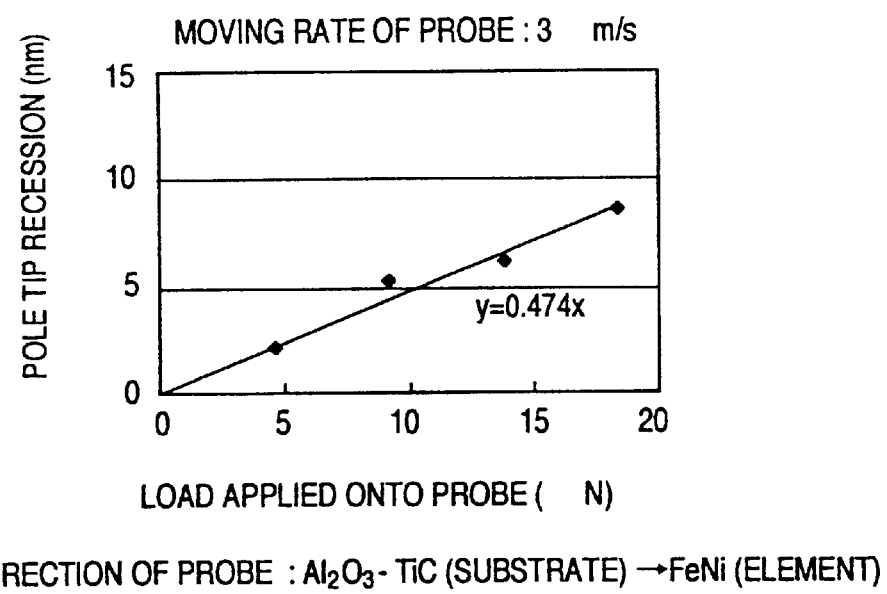
FIG. 6 is a graph showing a relationship present between a load applied to a probe and a pole-tip recession.

FIG. 6 shows the relationship between the pole-tip recession and loads applied to the probe, which pole-tip recession occurs between the $Al_2O_3$—TiC (alumina titanium carbide), which becomes the substrate 9 of magnetic head 1, and the permalloy, which becomes the magnetic element, when the probe is moved from the former to the latter. When the moving speed of the probe is, for example, 3 μm, the pole-tip recession occurring between the $Al_2O_3$—TiC (alumina titanium carbide) corresponding to the substrate 9 and the permalloy corresponding to the magnetic element increases almost in proportion to the loads applied to the probe.

Figure 7:
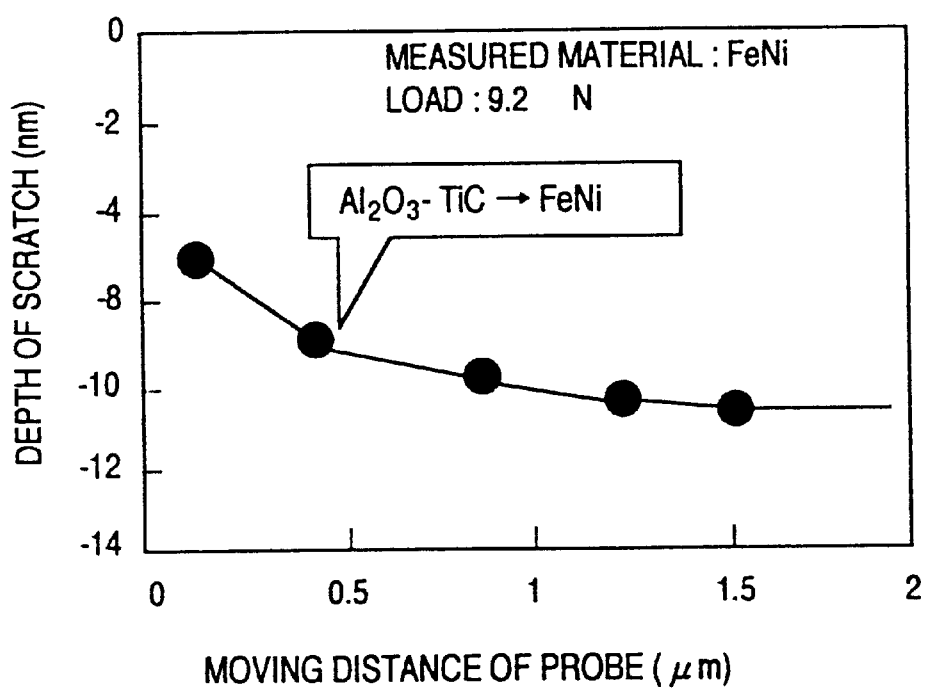
FIG. 7 is a graph showing a relationship present between the moving direction of a probe and the depth of a scratch.

Further, the depth of scratch occurring in the permalloy of the lowest hardness (,i.e., the material for the magnetic element) when a load of 9.2 μN was applied to the probe was investigated along the moving direction of the probe. The result of the investigation is shown in FIG. 7. Since no scratch is formed on the surface of the $Al_2O_3$—TiC (alumina titanium carbide) haring the high hardness, the scratch depth of this position was set to be 0 nm. The starting point of the abscissa was set to be the location of the interface defined between the $Al_2O_3$ (alumina), which becomes the base coat 10, and the permalloy. As is apparent from FIG. 7, when the probe is moved from the side of the $Al_2O_3$—TiC (alumina titanium carbide) to the permalloy side, scratches occurs mainly in the permalloy having the lower hardness and it has become evident that the depth of scratch increases as a distance spaced from the $Al_2O_3$ (alumina) side increases.

The above phenomenon is explained below while referring to FIG. 8 which schematically shows this phenomenon. It is assumed that a probe 20 is held by a so-called plate spring (spring constant k) called a cantilever.

Figure 8:
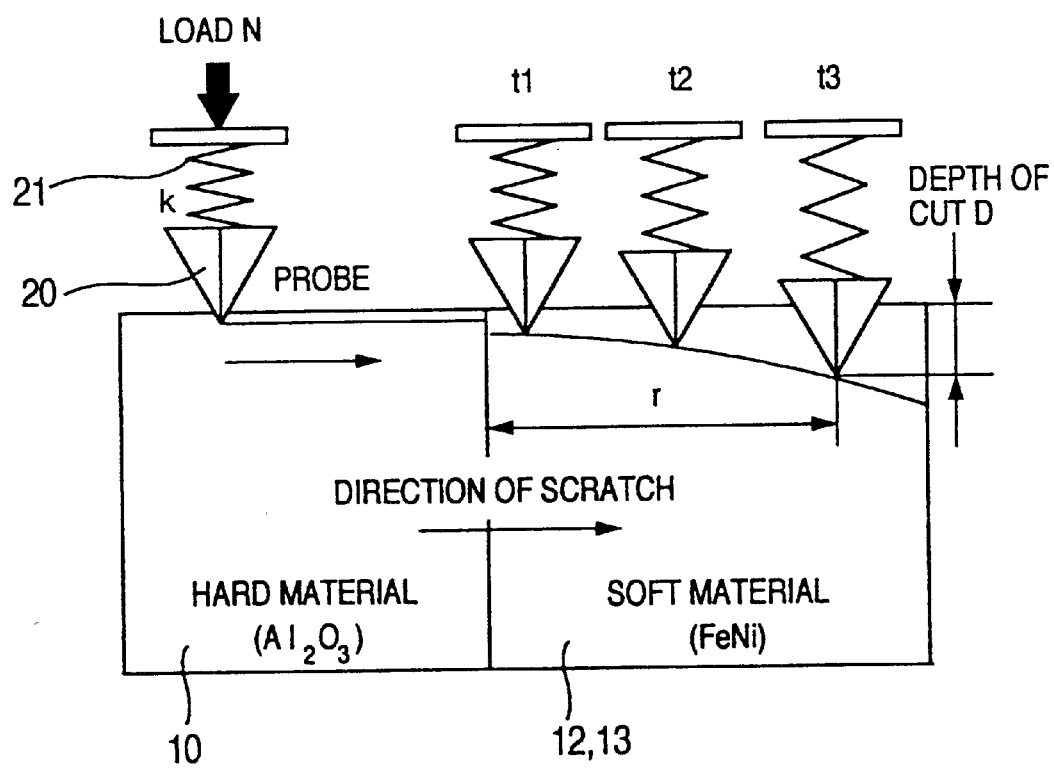
FIG. 8 is a schematic drawing for explaining the mechanism of the occurrence of the scratch.

When moving the probe 20 while applying a load N to the probe, it is assumed that, at first, the load N is in a balanced relation to a repulsion occurring form the material having a higher hardness (, that is, in FIG. 8, $Al_2O_3$ (alumina) having Vickers hardness of about 1000 Hv). Then, when the probe 20 is further advanced and passes the interface defined between the two materials of different hardness levels (, that is, the interface defined between the $Al_2O_3$ and the permalloy), the plate spring 21 is released from the repulsion. After that, as the probe 20 is further moved, it commences cutting the material of the material having the lower hardness (, that is, Permalloy having Vickers hardness of about 200 Hv).

However, it takes a predetermined period of time "t" before a depth of cut D which brings about a balanced state regarding the load N is reached in the material having the lower hardness. Thus, by shortening the time in which abrasive grains act against the material having the lower hardness, it is possible to reduce the depth of cut "D" in this material, i.e., the pole-tip recession.

It is thought that, in actual lapping, the abrasive grains are elastically held in a soft lapping plate. Therefore, in order to reduce the pole-tip recession, it becomes an effective means to enlarge a holding rigidity regarding the abrasive grains (, that is, a rigidity at which each of the abrasive grains is held in a lapping plate) to thereby reduce the displacement of cut of the abrasive grains which occurs between the materials during lapping. When a high-hardness lapping plate is selected, the projection height of the cutting edges of each of the abrasive grains does not come to have a same level due to a large degree of fixing of the abrasive grains, resulting in an increase in the depth of cut, so that the surface roughness of the lapped surface increases.

Therefore, in order to increase the holding rigidity regarding the abrasive grains, it is preferred to use a lapping plate made of a soft metal having a Vickers hardness of 80 to 400 Hv.

As is apparent from FIG. 7, the pole-tip recession in the magnetic head was relatively small in a region extending from the $Al_2O_3$ (alumina), which is the base coat, to the permalloy, which is the magnetic element, and was predominant (several nanometers) in another region extending from the substrate to the $Al_2O_3$ (alumina). Therefore, if the recession occurring in the alumina material used as the base coat can be reduced as small as possible, it is possible to obtain a magnetic head with a reduced pole-tip recession.

One of means for reducing the action of the abrasive grains on the $Al_2O_3$ (alumina) layer, which is the base coat, is to reduce the film thickness of the base coat. Therefore, samples were prepared in each of which the film thickness of the $Al_2O_3$ (alumina) layer is reduced, and a relationship between film thickness and pole-tip recession was examined. The method for preparing the samples is described below.

First, on a five-inch-sized substrate of $Al_2O_3$—TiC (alumina titanium carbide having a Vickers hardness of about 2000 Hv) was formed a base coat of $Al_2O_3$ (alumina having a Vickers hardness of about 1000 Hv) film having a thickness of about 0.05 to 10 μm. Then, on the base coat were laminated in sequence a lower shield layer, a gap film, a magnetoresistive film (permalloy having a Vickers hardness of about 400 Hv), an upper shield layer, and an overcoat ($Al_2O_3$ alumina).

Next, the substrate was cut to row bars each having a length of about 2 inches by use of a diamond wheel. In order to suppress the thickness variation and warp occurring in each of the row bars, a two-side lapping was then conducted.

After that, each of the row bars was bonded to a lapping jig, and in order to lap the magnetoresistive film 15 so that the height 22 of the magnetoresistive film 15 may become a predetermined size, the resistance values of resistance detection patterns were measured in process, by use of which measured values were performed the correction of the warp and tilt of each row bar and the working for obtaining the predetermined size regarding each row bar.

Next, in order to minimize the pole-tip recession and surface roughness and to increase the flatness of the air-bearing surface regarding each row bar, a sub-micron lapping was performed by use of only abrasive grains fixed to the lapping plate.

After that, the air-bearing surface was formed on the substrate surface intersecting at right angles to the face direction along which the base coat, magnetic recording film and etc. are laminated, by a method such as a well-known ion milling method or a reactive ion beam etching method. The shape of this air-bearing surface (rail) is formed by photolithography which is usually used.

After that, each of the row bars was cut in a slider shape by use of a diamond wheel, and the magnetic head shown in FIGS. 1A, 1B, and 2 was completed.

In this embodiment, $Al_2O_3$—TiC (alumina titanium carbide) was used as the material for the substrate 9. However, other substrates may be used if the Vickers hardness thereof is about 1000 to 4000 Hv. For example, SiC (Vickers hardness of about 2700 Hv), TiC (2000–3000 Hv), Si (about 1000 Hv), quartz glass (about 1000 Hv) may be used. Although in the embodiment $Al_2O_3$ (alumina) was used as the material for the base coat 10 in consideration of the adhesion to the substrate 9 and the lower shield layer 11, materials other than alumina may be used if their Vickers hardness and electrical insulating properties are equivalent or better than those of alumina.

In the above manufacturing method, in order to reduce the thickness of the base coat 10, flaws and foreign matters on the substrate 9 were removed, before forming the base coat, by physico-chemical surface treatment methods such as the CMP (chemical-mechanical polishing) and the GCIB (gas cluster ion beam) method, which are often adopted in the semiconductor manufacturing process, whereby a flatness not less than about 2 nm was ensured regarding the average surface roughness. Incidentally, although it was possible to form an alumina base coat of not more than 0.05 nm on this substrate 9, it was difficult to ensure an insulating property because pinholes were apt to occur.

Figure 9:
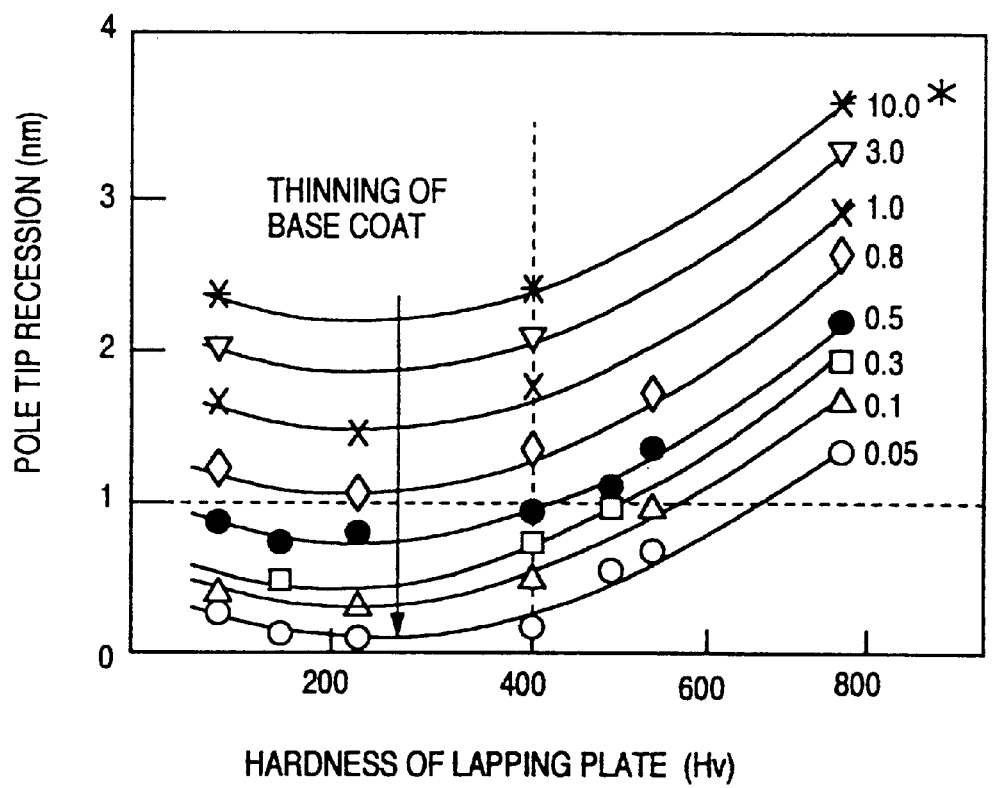
FIG. 9 is a graph showing a relationship present between the hardness of a lapping plate and a pole-tip recession.
Figure 10:
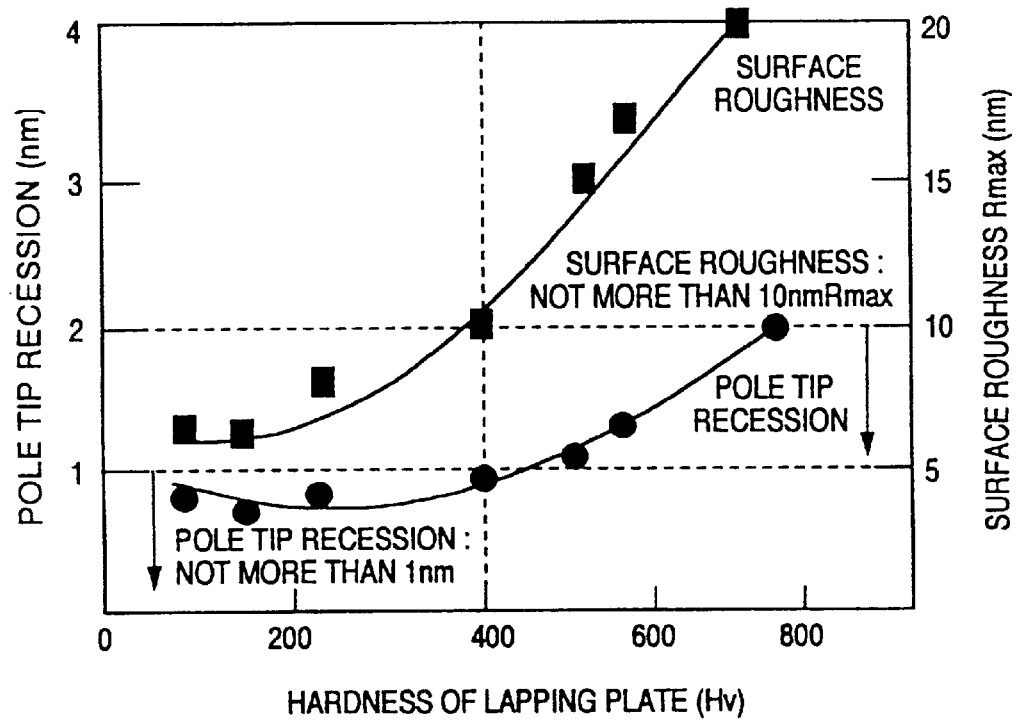
FIG. 10 is a graph showing a relationship present between the hardness of a lapping plate, the pole-tip recession and average surface roughness.

Further, in order to make the upper limit value of the thickness of the base coat 10 clear, several types of lapping plate materials were prepared, and lapping plates with fixed grains for lapping were fabricated. As the lapping plate materials, pure tin (Vickers hardness of 80 Hv), tin alloys (100–200 Hv), machinable ceramics (400 Hv), copper (420 Hv) and cast irons (450–800 Hv) were examined. The results thereof are shown in FIGS. 9 and 10. The relatively higher the Vickers hardness of the lapping plate is, the larger the holding rigidity for the abrasive grains becomes, so that it is thought that, as the result thereof, the depth of cut occurring by the elastic recovery thereof decreases as mentioned above.

On the other hand, in the manufacturing of the magnetic head, it is important not only to reduce the pole-tip recession as small as possible, desirably with no pole-tip recession, but also to reduce the surface roughness of the air-bearing surface at the same time. For achieving this, the flatness of the lapping plate to be used must be ensured. Therefore, on a lapping device provided with a lapping plate-conditioning machine made by Okamoto Kosakuki, the surface of the lapping plate was at first cut by use of a diamond cutting-tool, and the flatness of the lapping plate was corrected. Next, the surface of the lapping plate was subjected to a microscopic groove-correction by use of a diamond cutting-tool with an acute tip shape. After that, as shown in FIG. 5, the diamond abrasive grains were fixed onto the lapping plate 17 while dripping a slurry, in which abrasive grains of single-crystal diamond having a size of $\frac{1}{8}$ $\mu$m to $\frac{1}{10}$ $\mu$m were dispersed, onto the surface of the lapping plate 17 through a tube pump.

The fixing of the abrasive grains was performed by rubbing a correction ring made of ceramics such as alumina, against the surface of the lapping plate while applying a load to the correction ring and while rotating the lapping plate at not less than 10 rpm. After these abrasive grains were sufficiently embedded onto the lapping late, free abrasive grains on the lapping plate were thoroughly removed by washing.

The lapping for producing the magnetic head was performed by dripping only an oily hydrocarbon oil, which contains no abrasive grains, as a finishing liquid onto a dried lapping plate. Alternatively, as the finishing liquid, an ethylene glycol lubricant, etc., may be used instead of the hydrocarbon oil.

The lapping was performed by oscillating the row bar 18 in the radial direction of the lapping plate 17 while rotating the lapping plate 17. The evaluation of the pole-tip recession in the magnetic head was performed by use of the atomic force microscope (AFM).

FIG. 9 shows the relationship between the pole-tip recession in the magnetic head and materials for the lapping plate 17 which relationship occurred when the film thickness of the base coat 10 ($Al_2O_3$: alumina) was varied. It became apparent that the smaller the film thickness of the base coat, the smaller the pole-tip recessions occurring on the lapped surface of the magnetic head and that, when the film thickness is the same, the higher the hardness of the lapping plate, the larger the pole-tip recessions. In order to realize a pole-tip recession not more than the measurement resolution (1 nm) of the AFM, it is necessary to reduce the film thickness of the base coat so that it may become not more than 0.5 $\mu$m, and to perform lapping by use of a lapping plate having Vickers hardness not more than 400 Hv. As regards the lower limit of the film thickness of the base coat, it is, as described above, 0.05 $\mu$m at which the insulating property required regarding the base coat can be ensured.

Next, the relationship between pole-tip recession and the surface roughness of the lapped surface (air-bearing surface) was examined in detail in a case where the film thickness of the base coat was 0.5 $\mu$m, the result thereof being shown in FIG. 10.

It is apparent that, when the flying height defined between the magnetic head and the magnetic disk (shown in FIG. 2), which flying height is necessary for performing the writing and reading of a large capacity of magnetic recording information, is for example 5 μm, the range of Vickers hardness of the lapping plate in which the pole-tip recession (not more than 1 nm) and the surface roughness of the lapped surface (Rmax 10 nm) both required in the magnetic head are satisfied is not more than about 400 Hv.

In other words, by using a soft lapping plate with Vickers hardness not more than 400 Hv and an appropriate abrasive and by simultaneously making the film thickness of the base coat of $Al_2O_3$ (alumina), which is formed on the substrate of $Al_2O_3$—TiC (alumina titanium carbide), be in the range of 0.05 to 0.5 μm, it is possible to reduce the pole-tip recession occurring on the lapped surface so that the value of it may become not more than 1 nm and so that the average surface roughness may be not more than 10 nm, even in the composite structure formed of the materials having different Vickers hardness levels.

The invention makes it possible to reduce the flying height of a GMR or TRM magnetic head, thereby enabling the areal density of a hard disk drive to remarkably increase in which hard disk drive the above magnetic head is used.

While we have shown and described several embodiments in accordance with the invention, it should be understood that the disclosed embodiments are susceptible of changes and modifications without departing from the scope of the invention. Therefore, we do not intend to be bound by the details shown and described herein but intend to cover all such changes and modifications within the scope of the appended claims.

What is claimed is:

1. A magnetic head for reproducing magnetic recording information, comprising a substrate, a base coat located on said substrate, a magnetic element located on said base coat, and an air-bearing surface formed on a surface of said substrate said surface intersecting a face on which said magnetic element is provided, said base coat having a film thickness ranging from 0.05 μm to 0.5 μm, wherein an end face of the magnetic element located on the same surface side as that of the air bearing surface is not projected from an end face of the base coat located on the same surface side as that of the air bearing surface, and is recessed from the air bearing surface by a distance not greater than 1 nm, said air-bearing surface having an averaged surface roughness not greater than 10 nm.

2. A magnetic head according to claim 1, wherein said base coat comprises $Al_2O_3$ (alumina).

3. A magnetic head according to claim 1, wherein said base coat comprises $Al_2O_3$ (alumina) and said substrate comprises $Al_2O_3$ —TiC (alumina titanium carbide).

4. A magnetic head according to claim 1, wherein said base coat having a hardness less than that of the substrate but greater than that of said magnetic element.

5. A magnetic device for reproducing magnetic recording information comprising:
   a substrate defining an air-bearing surface and a pole tip recess;
   a magnetic element having an end surface located on the same surface side as that of the air-bearing surface; and
   a base coat provided between the substrate and the magnetic element, and having an end surface located on the same surface side as that of the air-bearing surface, the end surface of the magnetic element being not projected from the end surface of the base coat, and the base coat having a thickness ranging from about 0.05 μm to about 0.5 μm;
   wherein the pole tip recess is a vertical distance between the air-bearing surface and the end surface of the magnetic element that is proximate to the air-bearing surface, the pole tip recess being no more than 1 nm, the end surface of the magnetic element being substantially parallel to the air-bearing surface, and the air-bearing surface having an average surface roughness of no more than about 10 nm.

6. The device of claim 5, wherein the magnetic device is a magnetic head.

7. The device of claim 6, wherein the base coat comprises $Al_2O_3$ (alumina).

8. The device of claim 6, wherein the base coat comprises $Al_2O_3$ (alumina) and the substrate comprises $Al_2O_3$ —TiC (alumina titanium carbide).

9. The device of claim 6, wherein the base coat has a hardness less than that of the substrate but greater than that of the magnetic element.

10. A magnetic device for reproducing magnetic recording information, comprising:
    a substrate defining an air-bearing surface and a pole tip recess;
    a magnetic recording element having a surface located on the same surface side as that of the air-bearing surface, and
    a base coat provided between the substrate and the magnetic element having an end surface on the same surface side as that of the air-bearing surface, the surface of the magnetic element being not projected from the end surface of the base coat, and the base coat having a thickness ranging from about 0.05 μm to about 0.5 μm;
    wherein the pole tip recess is no more than about 1 nm the pole tip recess being a vertical distance between the air-bearing surface and the surface of the magnetic element, the surface of the magnetic element being substantially parallel to the air-bearing surface, the air-bearing surface having an average surface roughness of no more than 10 nm, and
    wherein the base coat has a hardness less than that of the substrate but greater than the magnetic element.

11. The magnetic device of claim 10, further comprising:
    an arm configured to suspend the substrate, the magnetic element, and the base coat over a magnetic medium to reproduce information recorded on the magnetic medium.

12. The magnetic device of claim 11, wherein the air-bearing surface and the surface of the magnetic element face the magnetic medium.

13. A magnetic head for reproducing magnetic recording information, comprising an electromagnetic element formed on a substrate, a base coat having a thickness ranging from 0.05 μm to 0.5 μm and being interposed between the substrate and the electromagnetic element, the substrate having a first surface on which the electromagnetic element is provided, and a second surface orthogonal to the first surface, formed thereon with an air-bearing surface, the base coat having an end surface located on the same surface side as that of the air-bearing surface and recessed from the air-bearing surface, the magnetic element having an end surface located on the same surface side as that of the air-bearing surface and recessed from the end surface of the base coat, the air-bearing surface being spaced from the end surface of the magnetic element by a distance not greater than 1 nm, and the air-bearing surface having an averaged surface roughness not greater than 10 nm.

14. A magnetic head for reproducing magnetic recording information, a substrate, and a base coat and a magnetic element formed on the substrate, the base coat having a thickness ranging from 0.05 µm to 0.5 µm, the substrate having a first surface on which the magnetic element is formed and a second surface orthogonal to the first surface, formed thereon with an air bearing surface, the air-bearing surface being polished with $Al_2O_3$ abrasive grain, the base coat having an end surface located on the same surface side as that of the air-beating surface, the magnetic element having an end surface located on the same surface side as that of the air-beating surface, recessed from the end surface of the base coat, and recessed from the air-bearing surface by a distance not greater than 1 nm, and to air-bearing surface having an averaged surface roughness not greater than 10 nm.

* * * * *